US007024213B2

(12) United States Patent
Cleary

(10) Patent No.: US 7,024,213 B2
(45) Date of Patent: Apr. 4, 2006

(54) INTELLIGENT SOURCE ROUTING FOR MOBILE HANDSET MESSAGE SERVICE PROVIDERS

(75) Inventor: James Cleary, North Sydney (AU)

(73) Assignee: Amethon Solutions (Asia Pacific) Pty Ltd., North Sydney (AU)

( * ) Notice: Subject to any disclaimer, the term of this patent is extended or adjusted under 35 U.S.C. 154(b) by 321 days.

(21) Appl. No.: 10/473,894

(22) PCT Filed: Apr. 10, 2002

(86) PCT No.: PCT/AU02/00462

§ 371 (c)(1),
(2), (4) Date: Oct. 2, 2003

(87) PCT Pub. No.: WO02/085046

PCT Pub. Date: Oct. 24, 2002

(65) Prior Publication Data

US 2005/0037784 A1 Feb. 17, 2005

(30) Foreign Application Priority Data

Apr. 11, 2001 (AU) .................................... PR 4336

(51) Int. Cl.
*H04Q 7/20* (2006.01)

(52) U.S. Cl. ...................... 455/466; 455/412; 455/414; 455/415; 455/426.1; 455/432.2

(58) Field of Classification Search ................ 455/466, 455/415, 426.1, 432.2, 560, 445, 458, 412, 455/414; 379/142.14, 142.15; 370/401
See application file for complete search history.

(56) References Cited

U.S. PATENT DOCUMENTS 6,085,100 A * 7/2000 Tarnanen .................... 455/466
6,134,432 A 10/2000 Holmes et al.
6,151,507 A 11/2000 Laiho et al.
6,178,331 B1 * 1/2001 Holmes et al. ............. 455/466
6,205,330 B1 * 3/2001 Winbladh ................ 455/426.1

* cited by examiner

*Primary Examiner*—Curtis Kuntz
*Assistant Examiner*—Tuan Pham
(74) *Attorney, Agent, or Firm*—Cohen, Pontani, Lieberman & Pavane

(57) ABSTRACT

A routing method for a mobile handset message system to facilitate identification of the correct return path for messages initially passing through a gateway from email or other electronic text or graphics message transmission device interfaced customers to message enabled mobile handset customers; the routing method including the steps of:

a) providing a routing system associated with a gateway; the system having a predetermined number of output lines each having a different calling line identifying number (CLID);
b) identifying the target telephone number for each incoming message received by the system;
c) routing each successive incoming message directed to the same target mobile handset through a different calling line identifying number based upon a predetermined pattern of usage in which the calling line identifying numbers are to be utilized;
d) storing a return path associated with each calling line identifying number and associated with each message which is dispatched from that number to a target mobile handset;
e) receiving a return message from a mobile handset at the same calling line identifying number which dispatched the original message and recalling the source of the original message which passed through that calling line identifying number;
f) routing the return message from the mobile handset to the originating source destination via an appropriate protocol converter.

7 Claims, 2 Drawing Sheets

INTELLIGENT SOURCE ROUTING FOR MOBILE HANDSET MESSAGE SERVICE PROVIDERS

PRIORITY CLAIM

This is a U.S. national stage of application No. PCT/AU02/00462, filed on Apr. 10, 2002. Priority is claimed on that application and on the following application: Country: Australia, Application No.: PR 4336, Filed: Apr. 11, 2001.

BACKGROUND OF THE INVENTION

The present invention discloses a routing system to facilitate the returning of messages from from mobile handset message recipients utilising or example SMS, EMS or MMS formats on mobile cell phones to message originators utilising electronic text or graphics message transmission devices other than a mobile phones. The following explanation of the invention is given with reference to the popular SMS format but it is not intended that the invention be restricted to such format.

It is currently possible and indeed popular for message originators, "A" parties, to send messages via e-mail to target persons, "B" parties utilising the SMS features of mobile phones. In order that such messages progress through the mobile telephone system and effect a change of format from E-mail to SMS it is necessary that the service provider interpose a "gateway" incorporating us ma-SMS protocol translator between the two systems. These gateways do not have the capability of routing return mess from the "B" party's mobile phone when the return message is initiated merely by utilising the SMS "reply" function of such phone. In order that current gateways correctly match the reply message to the original "A" party message it would be necessary for the "B" party to embed a code in the return message entered into the SMS functions of the mobile phone which code is readable and interpretable by the gateway through which the return message passes. This would be both inconvenient and impracticable.

SUMMARY OF THE INVENTION

It is accordingly an object of the present invention to facilitate return messages being sent by a graphics or text message recipient utilising a mobile handset back through a gateway to an originating party having an e-mail or other electronic text/graphics message sending interface without the handset enabled party having to embed a code in the return message.

According to the present invention there is provided an intelligent source routing system for a mobile handset message system to facilitate identification of the correct return path for messages initially passing through a gateway from email or other electronic text or graphics message transmission device interfaced customers to message enabled mobile handset customers; the routing system including the steps of:

a) providing a routing system associated with a gateway; the system having a predetermined number of output lines each having a different calling line identifying number (CLID);
b) identifying the target telephone number for each incoming message received by the system;
c) routing each successive incoming message directed to the same target mobile handset through a different calling line identifying number based upon a predetermined pattern of usage in which the calling line identifying numbers are to be utilized;
d) storing a return path associated with each calling line identifying number and associated with each message which is dispatched from that number to a target mobile handset;
e) receiving a return message from a mobile handset at the same calling line identifying number which dispatched the original message and recalling the source of the original message which passed through that calling line identifying number;
f) routing the return message from the mobile handset to the originating source destination via an appropriate protocol converter.

BRIEF DESCRIPTION OF THE DRAWINGS

One embodiment of the preset invention will now be described with reference to the accompanying flow charts in which;

Flow chart 1 depicts a typical path for an E-mail progressing from an "A" party tough a gateway associated with an intelligent source routing device to a "B" party utilising the SMS features of a mobile phone and;

Flow chart 2 depicts a typical return path for an SMS message progressing from a "B" party through a gateway and intelligent source routing device in accordance with the present invention to an originating "A" party.

PREFERRED MODE OF CARRYING OUT THE INVENTION

Figure 1:
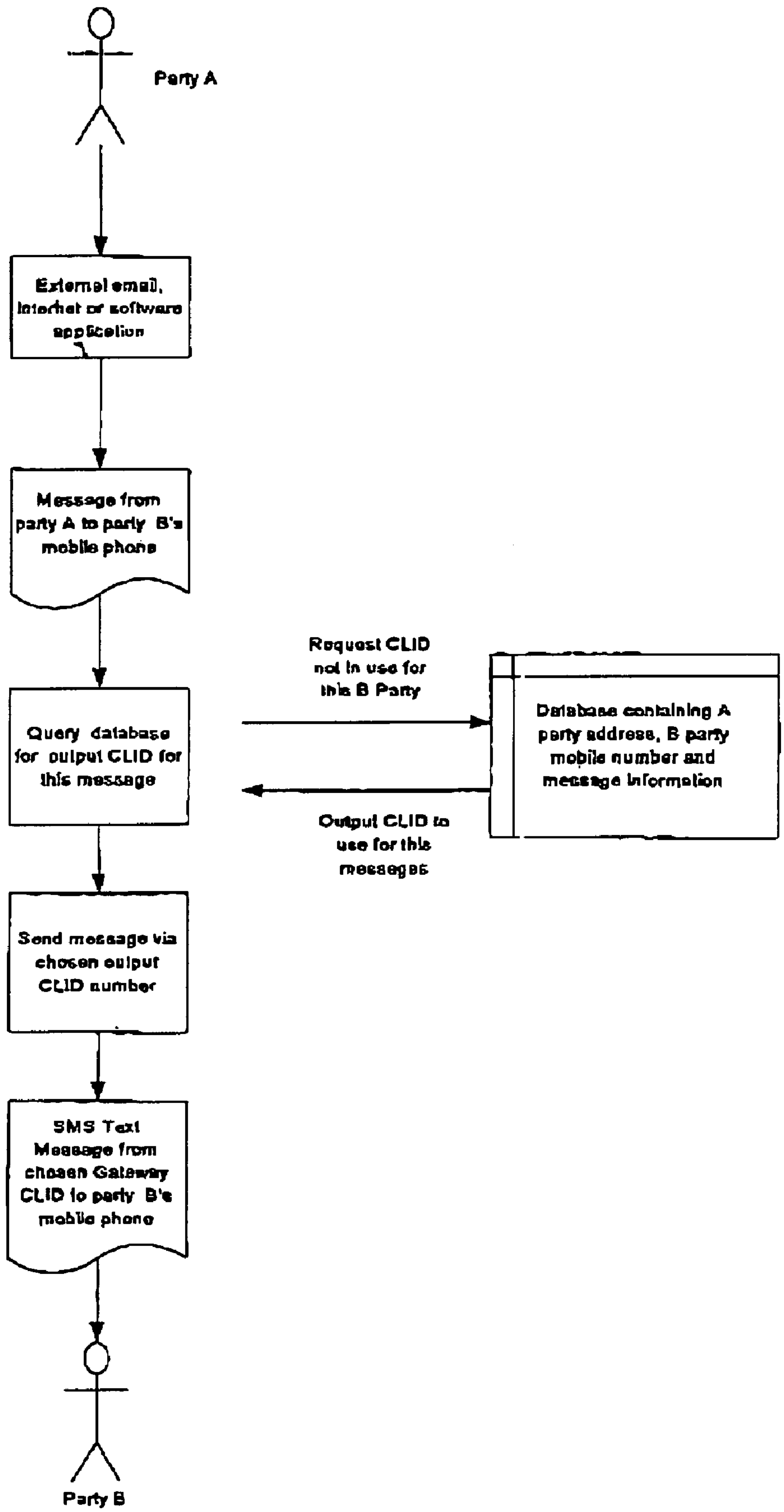

With reference now to FIG. 1 it will be noted that when the message is received by the intelligent source routing device the device first looks at the addressee and the then requests a CLID which is not in use during the current cycle relative to that addressee. Once a CLID is assigned to the message and it is established that that CLID is not already in use during the current cycle relative to that addressee the message may be dispatched the mobile phone utilising the assigned CLID. Of course an appropriate protocol conversion will have been effected by the gateway somewhere along the message pathway.

It should be noted that the protocol conversion which must take place is effected by a gateway in the normal manner. An intelligent source routing device maybe incorporated within the gateway or alternatively the gateway effecting the protocol conversion maybe placed between the "A" party and the intelligent source routing device or alternatively the intelligent source routing device may be placed between the "A" party and the gateway.

Figure 2:
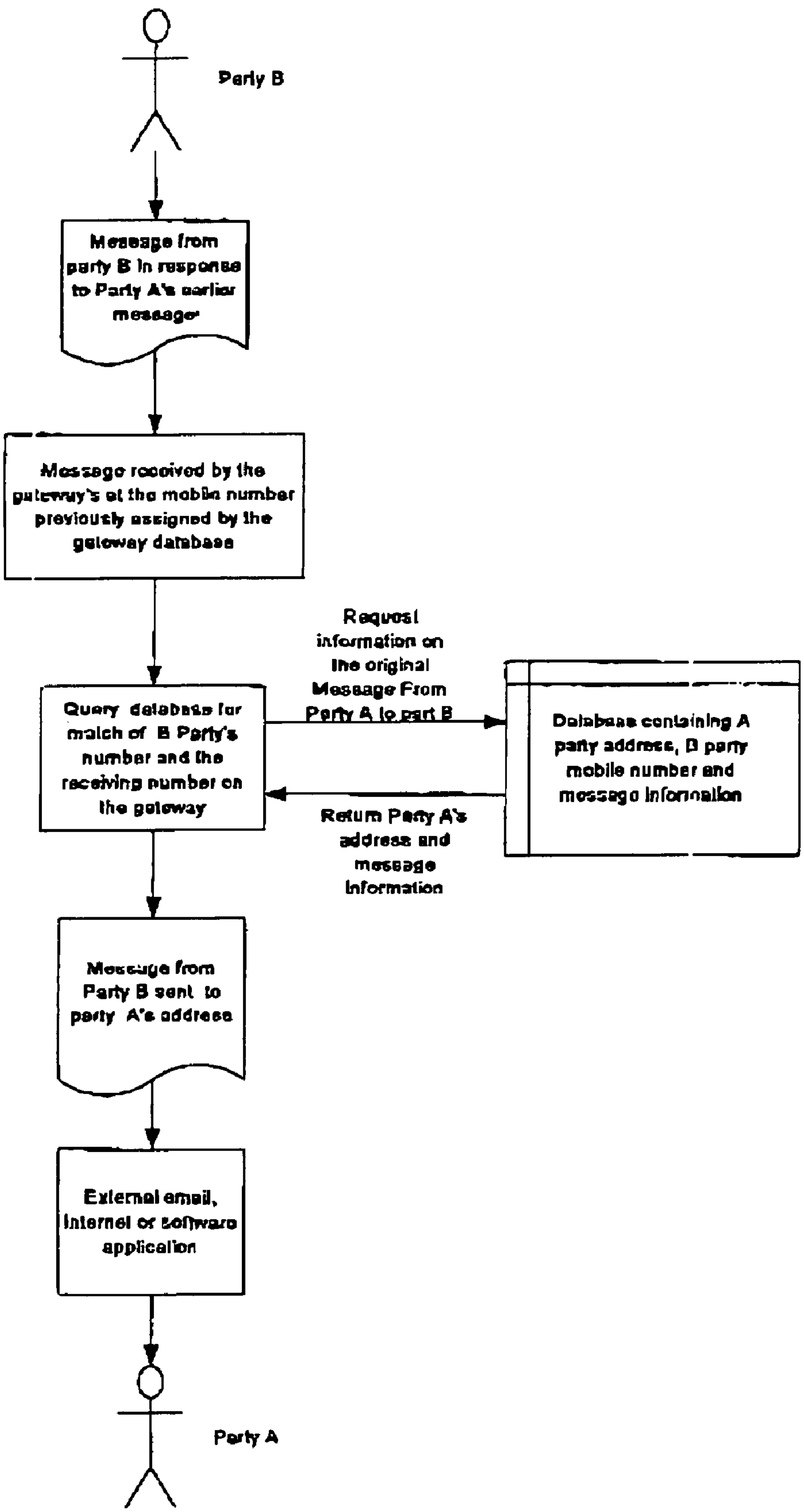

Turning now to FIG. 2 it will be seen that when the "B" party replies to a message from the "A" party the message is received by the intelligent source routing device at the telephone number (CLID) originally assigned by the relevant database and then a query is sent to the database in order retrieve the original message and hence identify the relevant return path. Once the return party is identified the protocol conversion is effected and the message is dispatched to the "A" party.

If for example the mobile phones an a given system possess only a capability of storing ten SMS messages (as is currently the case) an intelligent source routing device in accordance with the present invention having subscribers with such phones need only have 10 CLIDs.

An appropriate cycle pattern may be a round-robin pattern or a time period of one week or even one month. It will be appreciated that if a cycle time of one week is chosen then any messages stored on a particular mobile-phone which are over one week old will not be capable of being the subject of a reply via the intelligent source routing device having regard to the fact that the database associated with CLID) through which the message originally passed will have cleared the relevant information and hence the return path will have been “forgotten”.

In the event and that the cycle time is set at one week and more than 10 messages are sent to a particular a mobile phone during that period then the latest message will be assigned to the CLID which handled the earliest message and hence the information referable to the earliest message will have been lost and it will no longer be possible for the intelligent source routing device to accept a return message in respect of such earliest message. Of course this will be of no consequence as the earliest message will probably also have been deleted from the relevant mobile phone in order that the phone can except its latest messages.

It will be appreciated that alternate embodiments of the present invention may be devised apart from those embodiments above described and it is the intention of the present document that such embodiments fall within the scope of the present invention. For example the electronic text or graphics communication device being used by the “A” party need not be E-mail but may for example be an interface using the XML data transmission format.

What is claimed is:

1. A return message routing method for a mobile handset message system to facilitate identification of the correct return path for messages initially passing through a gateway from email or other electronic text or graphics message transmission device interfaced customers to message enabled mobile handset customers; the routing method comprising the steps of:

a) providing a routing system associated with a gateway; the system having a predetermined number of output lines each having a different calling line identifying number (CLID);

b) identifying the target telephone number for each incoming message received by the system;

c) routing each successive incoming message directed to the same target mobile handset through a different calling line identifying number based upon a predetermined pattern of usage in which the calling line identifying numbers are to be utilized;

d) storing a return path associated with each calling line identifying number and associated with each message which is dispatched from that number to a target mobile handset;

e) receiving a return message from a mobile handset at the same calling line identifying number which dispatched the original message and recalling the source of the original message which passed through that calling line identifying number;

f) routing the return message from the mobile handset to the originating source destination via an appropriate protocol converter.

2. A return message routing method in accordance with claim 1 hereof wherein the mobile handset message system is comprised of mobile cell phones in conjunction with the existing SMS protocol.

3. A return message routing method in accordance with claim 1 hereof wherein the predetermined number of output lines exceeds the number of messages that may be stored in individual target mobile handsets.

4. A return message routing method in accordance with claim 1 hereof wherein the pattern is time based such that a sequence of CLID usage by the system referable to a particular target handset is observed until the expiry of a time limit whereupon the sequence of CLID usage is repeated or an alternate sequence of usage commenced.

5. A return message routing method in accordance with claim 1 hereof wherein the pattern is a closed loop such that CLIDs are initially utilized in accordance with a predetermined sequence and after exhaustion of available CLIDs for a target handset the CLIDs are reused in a predetermined sequence.

6. A return message routing method in accordance with claim 1 hereof wherein the message originators are email interfaced to the gateway of the system.

7. A return message routing method in accordance with claim 1 hereof wherein the message originators are interfaced to the system via a web page utilizing HTTP protocol.

* * * * *